(12) United States Patent
Kim et al.

(10) Patent No.: US 10,397,961 B2
(45) Date of Patent: Aug. 27, 2019

(54) METHOD OF CONNECTING TERMINALS IN PREDETERMINED SPACE AND TERMINAL THEREFOR

(71) Applicant: Samsung Electronics Co., Ltd., Gyeonggi-do (KR)

(72) Inventors: Hyeong-seop Kim, Gyeonggi-do (KR); Kill-yeon Kim, Gyeonggi-do (KR); Sung-ha Yoo, Gyeonggi-do (KR); Jong-hyuk Jang, Gyeonggi-do (KR); Mun-hwan Choi, Seoul (KR)

(73) Assignee: Samsung Electronics Co., Ltd (KR)

( * ) Notice: Subject to any disclaimer, the term of this patent is extended or adjusted under 35 U.S.C. 154(b) by 129 days.

(21) Appl. No.: 15/189,700

(22) Filed: Jun. 22, 2016

(65) Prior Publication Data
US 2016/0374121 A1 Dec. 22, 2016

(30) Foreign Application Priority Data
Jun. 22, 2015 (KR) .................. 10-2015-0088719

(51) Int. Cl.
*G06F 15/16* (2006.01)
*H04W 76/10* (2018.01)
(Continued)

(52) U.S. Cl.
CPC .......... *H04W 76/10* (2018.02); *H04B 10/116* (2013.01); *H04B 11/00* (2013.01); *H04L 65/1069* (2013.01); *H04W 8/005* (2013.01)

(58) Field of Classification Search
CPC ..................................................... H04W 76/02
(Continued)

(56) References Cited

U.S. PATENT DOCUMENTS

| 6,662,137 | B2 | 12/2003 | Squibbs |
| 6,801,507 | B1 * | 10/2004 | Humpleman ..... H04L 12/40117 370/252 |

(Continued)

FOREIGN PATENT DOCUMENTS

| KR | 10-2014-0011219 | 1/2014 |
| KR | 10-2014-0027893 | 3/2014 |

(Continued)

OTHER PUBLICATIONS

International Search Report dated Sep. 29, 2016 issued in counterpart application No. PCT/KR2016/006623, 11 pages.

(Continued)

*Primary Examiner* — Hee Soo Kim
(74) *Attorney, Agent, or Firm* — The Farrell Law Firm, P.C.

(57) ABSTRACT

A terminal and a method of connecting terminals in a predetermined space are provided. The terminal includes a first communication interface configured to transmit a signal for executing input applications of a plurality of terminals through a first communication scheme; a second communication interface configured to broadcast information about the first terminal through a second communication scheme; and a processor configured to generate a list of terminals located in the predetermined space, based on responses from terminals that received the information about the first terminal through the second communication scheme.

18 Claims, 16 Drawing Sheets

(51) Int. Cl.
*H04B 10/116* (2013.01)
*H04B 11/00* (2006.01)
*H04L 29/06* (2006.01)
*H04W 8/00* (2009.01)

(58) Field of Classification Search
USPC .......................................................... 709/227
See application file for complete search history.

(56) References Cited

U.S. PATENT DOCUMENTS

| | | | |
|---|---|---|---|
| 7,400,594 B2 | 7/2008 | Pereira et al. | |
| 7,512,685 B2* | 3/2009 | Lunsford | H04L 12/5692 455/41.2 |
| 7,848,704 B2 | 12/2010 | Smith | |
| 8,023,895 B2 | 9/2011 | Smith | |
| 8,379,546 B2* | 2/2013 | Schleiss | H04W 48/08 370/277 |
| 9,191,801 B2 | 11/2015 | Kwak | |
| 2007/0264991 A1 | 11/2007 | Jones et al. | |
| 2007/0275657 A1* | 11/2007 | Chang | H04L 1/1854 455/9 |
| 2009/0011707 A1 | 1/2009 | Ko et al. | |
| 2011/0052214 A1* | 3/2011 | Shimada | H04B 10/1141 398/202 |
| 2013/0227149 A1* | 8/2013 | Athlur | H04L 67/14 709/227 |
| 2014/0022939 A1 | 1/2014 | Apte et al. | |
| 2014/0128031 A1 | 5/2014 | Park et al. | |
| 2014/0179230 A1 | 6/2014 | Sydir et al. | |
| 2014/0185529 A1* | 7/2014 | Lim | H04W 8/005 370/328 |
| 2015/0029880 A1* | 1/2015 | Burns | H04W 4/70 370/252 |
| 2015/0031403 A1* | 1/2015 | Kwak | H04W 8/005 455/500 |
| 2015/0127733 A1 | 5/2015 | Ding et al. | |
| 2015/0286263 A1 | 10/2015 | Heo et al. | |

FOREIGN PATENT DOCUMENTS

| | | |
|---|---|---|
| KR | 10-2014-0058996 | 5/2014 |
| KR | 10-2015-0011640 | 2/2015 |
| WO | WO 2010/100555 | 9/2010 |

OTHER PUBLICATIONS

European Search Report dated Jun. 13, 2018 issued in counterpart application No. 16814677.7-1220, 9 pages.

* cited by examiner

METHOD OF CONNECTING TERMINALS IN PREDETERMINED SPACE AND TERMINAL THEREFOR

PRIORITY

This application claims priority under 35 USC § 119(a) to Korean Patent Application No. 10-2015-0088719, which was filed in the Korean Intellectual Property Office on Jun. 22, 2015, the entire disclosure of which is incorporated herein by reference.

BACKGROUND

1. Field of the Disclosure

The present disclosure relates generally to a method of connecting terminals and a terminal therefor.

2. Description of the Related Art

The Internet, which is a human centered connectivity network through which humans generate and consume information, is evolving into the Internet of Things (IoT) in which distributed entities, i.e., things, exchange and process information without human intervention.

The Internet of Everything (IoE), which is a combination of IoT technology and Big Data processing technology via a cloud server, has also emerged. As there is a demand for technological elements, such as "sensing technology", "wired/wireless communication and network infrastructure", "service interface technology", and "Security technology" for IoT implementation, a sensor network, Machine-to-Machine (M2M) communication, Machine Type Communication (MTC), etc., are actively being researched.

Such an IoT environment may provide intelligent Internet technology services that create a new services by collecting and analyzing data generated among connected things. IoT may be applied to a variety of fields including smart homes, smart buildings, smart cities, smart and/or connected cars, smart grids, health care, smart appliances, and advanced medical services through convergence and combination between existing Information Technology (IT) and various industrial applications.

Accordingly, there is currently strong interest in connecting various types of terminals in such an IoT environment.

SUMMARY

An aspect of the present disclosure is to provide a method of connecting terminals in a predetermined space by using heterogeneous communication schemes and an apparatus using the same.

In accordance with an aspect of the present disclosure, a first terminal is provided for connecting terminals in a predetermined space. The first terminal includes a first communication interface configured to transmit a signal for executing input applications of a plurality of terminals through a first communication scheme; a second communication interface configured to broadcast information about the first terminal through a second communication scheme; and a processor configured to generate a list of terminals located in the predetermined space, based on responses from terminals that received the information about the first terminal through the second communication scheme.

In accordance with another aspect of the present disclosure, a method is provided for connecting terminals in a predetermined space. The method includes transmitting, by a first terminal, a signal for executing input applications of a plurality of terminals through a first communication scheme; broadcasting, by the first terminal, information about the first terminal through a second communication scheme; receiving responses from terminals that received the information about the first terminal through the second communication scheme; and generating a list of terminals located in the predetermined space, based on the responses.

In accordance with another aspect of the present disclosure, a non-transitory computer-readable recording medium is provided, which has recorded thereon, a computer-readable program for executing a method of connecting terminals in a predetermined space.

BRIEF DESCRIPTION OF THE DRAWINGS

The above and other aspects, features, and advantages of certain embodiments of the present disclosure will become more apparent from the following description when taken in conjunction with the accompanying drawings, in which.

DETAILED DESCRIPTION OF EMBODIMENTS OF THE DISCLOSURE

Figure 1:
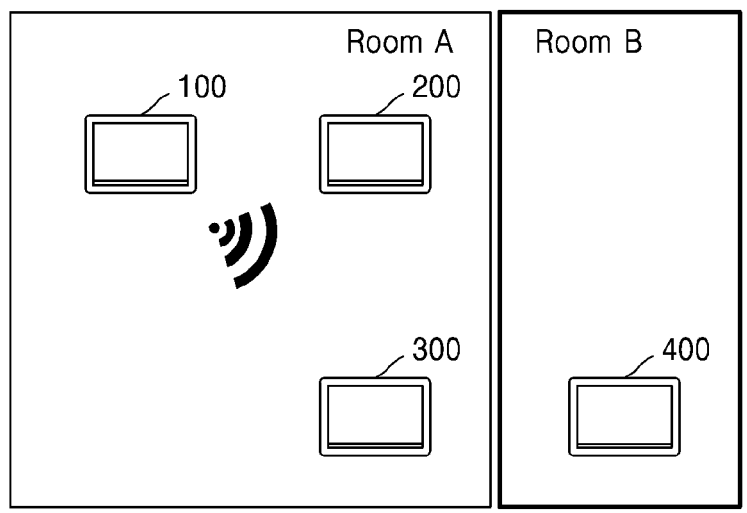
FIG. 1 illustrates an environment including a plurality of terminals according to an embodiment of the present disclosure.

Various embodiments of the present disclosure will now be described in detail with reference to the accompanying drawings. In the following description, specific details such as detailed configuration and components are merely provided to assist the overall understanding of these embodiments of the present disclosure. Therefore, it should be apparent to those skilled in the art that various changes and modifications of the embodiments described herein can be made without departing from the scope and spirit of the present disclosure. In addition, descriptions of well-known functions and constructions are omitted for clarity and conciseness.

In the accompanying drawings, like reference numerals refer to like elements throughout.

Herein, expressions such as "at least one of," when preceding a list of elements, modify the entire list of elements and do not modify the individual elements of the list.

Terms such as "include" and "comprise" indicate the presence of a plurality of elements or steps described in the specification, and it should be understood that some of the elements or steps may be omitted and/or additional elements or steps may be further included.

Although terms, such as "first" and "second" can be used to describe various elements, e.g., to distinguish a certain element from another element, the elements should not be limited by the terms.

FIG. 1 illustrates an environment including a plurality of terminals according to an embodiment of the present disclosure.

Referring to FIG. 1, a plurality of (first to fourth) terminals 100, 200, 300, and 400 are located in two different areas, i.e., Room A and Room B. Specifically, the first terminal 100, the second terminal 200, and the third terminal 300 are located in Room A, and the fourth terminal 400 is located in Room B. For example, each of the plurality of terminals 100, 200, 300, and 400 may be a mobile device such as a smartphone, a tablet personal computer (PC), a laptop computer, or a wearable device that may be worn by a user as a user device which may communicate with other terminals.

In FIG. 1, when it is desired that the first, second, and third terminals 100, 200, and 300 located in Room A are connected to share information, it may be difficult to correctly select and connect the first, second, and third terminals 100, 200, and 300 without geographic information about Room A. For example, when only the first, second, and third terminals 100, 200, and 300 located in Room A are to be connected, another terminal existing in a coverage area of an AP may inadvertently be connected. In addition, some of the first, second, and third terminals 100, 200, and 300 may be omitted by acquiring incorrect location information of the terminals due to a change in a signal strength.

Figure 2:
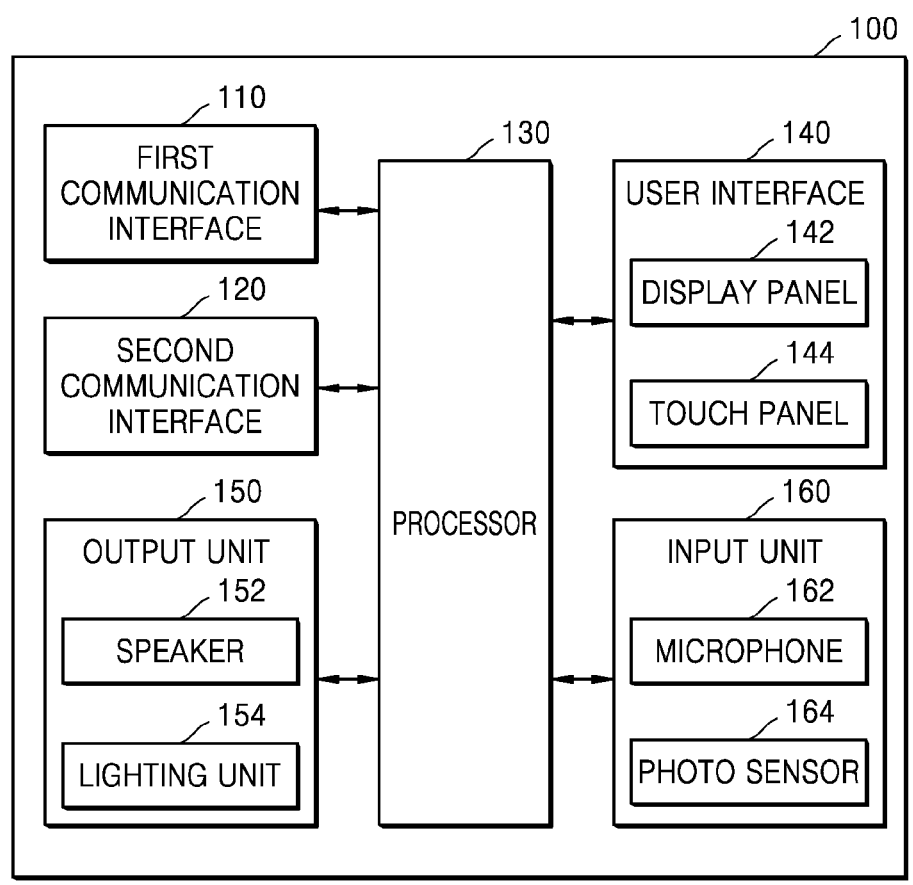
FIG. 2 illustrates a terminal according to an embodiment of the present disclosure.

FIG. 2 illustrates a terminal according to an embodiment of the present disclosure. For example, the terminal illustrated in FIG. 2 corresponds to the first terminal 100 as illustrated in FIG. 1, but may also be applied to the other terminals 200, 300, and 400 of FIG. 1.

Referring to FIG. 2, the first terminal 100 includes a first communication interface 110, a second communication interface 120, a processor 130, a user interface 140, an output unit 150, and an input unit 160.

The first communication interface 110 may perform communication according to a first communication scheme, e.g., a wireless communication scheme using electromagnetic waves. When the first terminal 100 performs wireless communication with at least one external device, the first terminal 100 may transmit and receive information through the first communication interface 110.

The first communication interface 110 may perform communication with a plurality of external devices in a coverage area according to the first communication scheme. The coverage area indicates an area in which high quality communication is performed while maintaining link quality required for a radio link.

The first communication interface 110 may perform communication with various types of external devices according to various types of wireless communication schemes. The first communication interface 110 may include at least one of a Bluetooth chip, a Wi-Fi chip, a mobile communication chip, a ZigBee chip, and a near field communication (NFC) chip.

The Bluetooth chip and the Wi-Fi chip may perform communication by using a Bluetooth scheme and a Wi-Fi scheme, respectively. When the Bluetooth chip or the Wi-Fi chip is used, various kinds of connection information such as a service set identifier (SSID) and a session key may be transmitted and received in order to establish communication and then transmit and receive various kinds of information. The Bluetooth chip may support short-range wireless communication based on a Bluetooth 4.0 (Bluetooth low energy (BLE)) protocol.

The mobile communication chip performs communication according to various communication standards such as third generation (3G), third generation partnership project (3GPP), and long term evolution (LTE).

The ZigBee chip may support short-range wireless communication corresponding to one of the Institute of Electrical and Electronics Engineers (IEEE) 802.15.4 standards and may be used for low-speed data communication between devices within a distance of about 20 meters.

The NFC chip uses a short-range wireless communication scheme in a frequency band of 13.56 MHz among various radio frequency identification (RF-ID) frequency bands.

The second communication interface 120 may perform communication according to a second communication scheme, e.g., using sound waves and/or visible light.

When the first terminal 100 performs second communication or visible light communication with at least one external device, the first terminal 100 may transmit and receive information by using the second communication interface 120. The second communication interface 120 may be linked to a speaker 152 or a lighting unit 154 to respectively emit sound waves or visible light.

The second communication interface 120 may broadcast information to a plurality of external devices according to the second communication scheme. The second communication interface 120 may transmit information to external devices around the first terminal 100 without information about the external devices which receive the information, by using a broadcast characteristic of sound waves or light.

The processor 130 may perform a general control of the first terminal 100. The processor 130 may perform communication with external devices by using the first communication interface 110 and/or the second communication interface 120. The processor 130 may output a certain signal to the outside through the output unit 150 or receive a certain signal from the outside through the input unit 160. When a user operation is received through the user interface 140, the processor 130 may perform a control operation corresponding to the user operation.

The processor 130 may include at least one of random access memory (RAM), read-only memory (ROM), a central processing unit (CPU), a graphic processing unit (GPU), and a data bus. For example, the RAM, the ROM, the CPU, and the GPU may be connected to each other through the data bus.

The CPU boots the first terminal 100 by using an operating system (OS) stored in a memory. In addition, the CPU performs various operations by using various kinds of programs, content, data, etc., which may also be stored in the memory.

The ROM stores an instruction set for system booting, etc. For example, when power is initially supplied to the first terminal 100, the CPU may boot the system by copying the OS stored in the memory to the RAM according to instructions stored in the ROM and executing the OS. When the booting is completed, the CPU may copy the various kinds of programs stored in the memory to the RAM and perform various kinds of operations by executing the programs copied to the RAM.

When booting of the first terminal 100 is completed, the GPU may display a user interface screen image in a region of a display panel 142. For example, the GPU may generate an electronic document including various objects such as content, an icon, and a menu. The GPU may compute attribute values of coordinates, a shape, a size, a color, and the like by which each object is to be displayed, according to a layout of a screen. Thereafter, the GPU may generate screen images of various layouts including objects based on the computed attribute values. The screen images generated by the GPU may be provided to the display panel 142 and displayed on respective regions of the display panel 142.

The user interface 140 includes the display panel 142 and a touch panel 144. The user interface 140 may provide information to a user or receive various instructions from the user. The display panel 142 may be implemented by various types of displays such as a liquid crystal display (LCD), an organic light-emitting diode (OLED) display, an active-matrix organic light-emitting diode (AM-OLED) display, and a plasma display panel (PDP). The display panel 142 may be implemented to be flexible, transparent, and/or wearable.

The touch panel 144 may detect a touch input of the user and output a touch event value corresponding to the detected touch signal. When the touch panel 144 is coupled to the display panel 142 to configure a touch screen, the touch screen may be implemented by various types of touch sensors such as a capacitive overlay touch sensor, a resistive overlay touch sensor, and a piezoelectric touch sensor. The capacitive overlay touch sensor calculates touch coordinates by detecting micro electricity caused by the user's body touching a surface of the touch screen. The resistive overlay touch sensor includes two electrode plates embedded in the touch screen and calculates touch coordinates by detecting a current flowing according to contact between the two electrode plates at a touched point. For example, a touch event on the touch screen may be generated by a finger of a human being, but may also be generated by any conductive material capable of causing a change in a capacitance.

The output unit 150 may be used to output a signal generated by the first terminal 100. The output unit 150 includes the speaker 152 and the lighting unit 154. The speaker 152 may output audio data, e.g., sound waves having data carried thereon.

The lighting unit 154 may emit light. For example, the lighting unit 154 may include a light-emitting element such as a light-emitting diode (LED) and may transmit data through blinking of light.

The input unit 160 may receive a signal from the outside. The input unit 160 may include a microphone 162 and a photo sensor 164. A signal input to the microphone 162 or the photo sensor 164 may be converted into an electrical signal and processed by the first terminal 100. The microphone 162 may receive audio data and the photo sensor 164 converts light itself or information included in the light into an electrical signal and detects the electrical signal.

The names of the components of the first terminal 100 may vary. In addition, the components included the first terminal 100 may vary, i.e., some components may be omitted and/or other components may be added. For example, when the first terminal 100 provides both transmission and reception functions, the first terminal 100 may include both the output unit 150 and the input unit 160, but when the first terminal 100 only provides the transmission function, components such as the input unit 160 may be omitted, and when the first terminal 100 only provides the reception function, components such as the output unit 150 may be omitted.

The user interface 140 may be included or omitted according to a type or characteristic of the first terminal 100. The first terminal 100 may perform a process of connecting terminals in a predetermined space by using at least one of the components described above.

Figure 3:
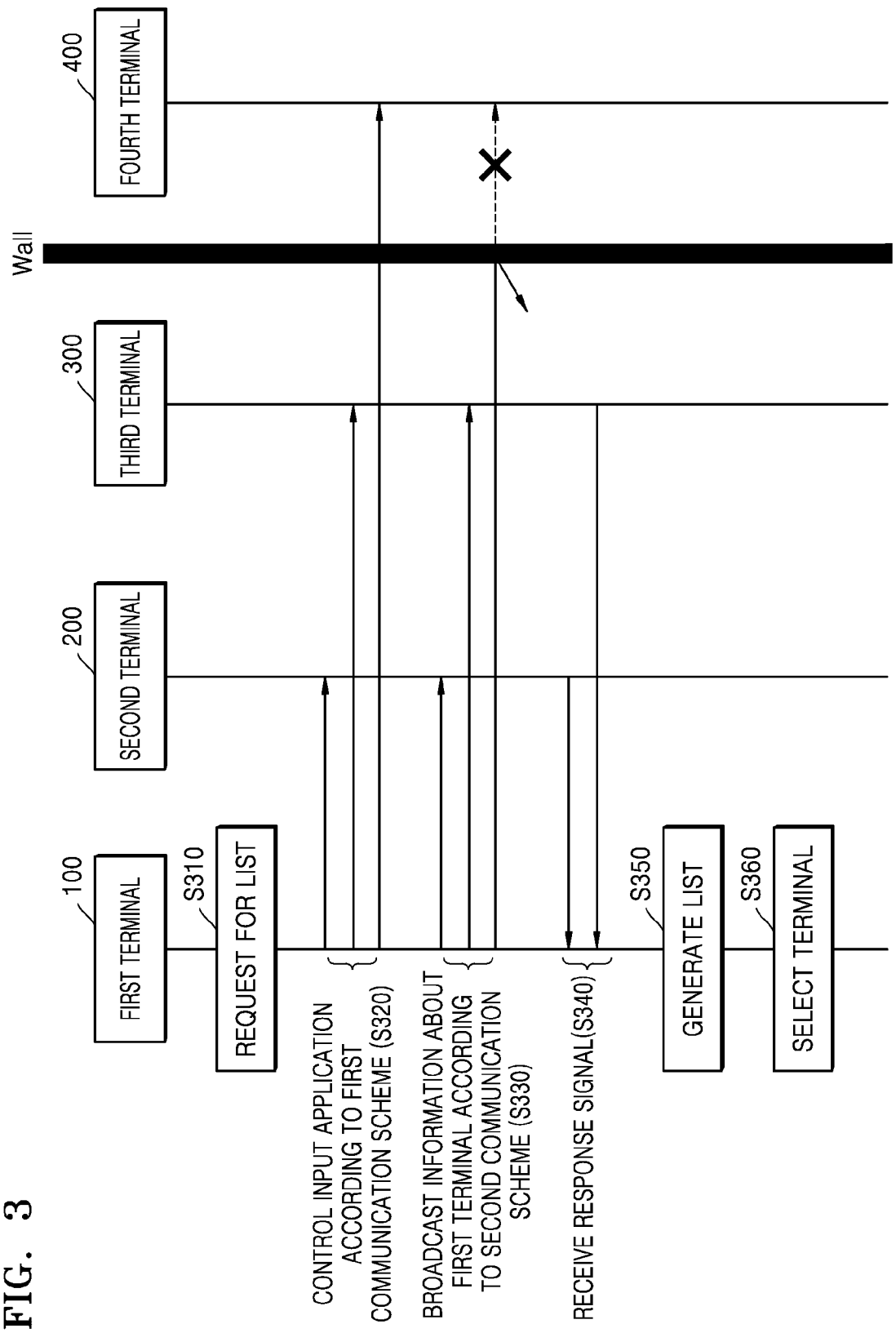
FIG. 3 illustrates a process of connecting terminals in a predetermined space, according to an embodiment of the present disclosure.

FIG. 3 illustrates a process of connecting terminals in a predetermined space, according to an embodiment of the present disclosure. For example, FIG. 3 illustrates a process in which the first terminal 100 connects with the second and third terminals 200 and 300, as illustrated in FIG. 1.

Referring to FIG. 3, in step S310, the first terminal 100 receives a request for a list of terminals in a predetermined space. For example, the first terminal 100 may receive the request for the list of the terminals from a user or may detect the request for the list of the terminals in the predetermined space, upon an occurrence of a certain condition or situation, e.g., when the first terminal 100 moves to the predetermined space.

In step S320, the first terminal 100 controls an input application of a plurality of terminals in a coverage area according to the first communication scheme. Specifically, the first terminal 100 transmits a signal for controlling the input application of the plurality of terminals through the first communication interface 110.

As illustrated in FIG. 3, the first terminal 100 controls an input application of the second, third, and fourth terminals 200, 300, and 400 by using the first communication scheme.

Using the first communication scheme, the first terminal 100 may request the terminals in the coverage area to execute the input application for a predetermined time. After the predetermined time elapses, the terminals in the coverage area of the first communication scheme may automatically end the execution of the input application to prevent power consumption.

In step S330, the first terminal 100 broadcasts information about the first terminal 100 using the second communication scheme. The information about the first terminal 100 may be unique information related to the first terminal 100 or certain information obtained by the first terminal 100. For example, the information about the first terminal 100 may be identification information of the first terminal 100, identification information of a group that the first terminal 100 desires to create, or security information to be used to connect the terminals in the predetermined space.

As illustrated in FIG. 3, the signal for controlling the input application, which is transmitted using the first communication scheme, is delivered to the second terminal 200 and the third terminal 300 as intended, but is also transmitted to the fourth terminal 400 by passing through a wall forming the predetermined space because electromagnetic waves used for the first communication scheme can pass through a wall forming the predetermined space. However, the information about the first terminal 100, which is broadcast using the second communication scheme, is only delivered to the second terminal 200 and the third terminal 300, but is not delivered to the fourth terminal 400 because the information transmitted using the second communication scheme cannot pass through the wall forming the predetermined space. For example, sound waves or visible light used for the second communication scheme cannot pass through a wall.

As described above, when a characteristic of sound waves or visible light having low permeability is used, registration in a group including a nearby terminal located outside the predetermined space may be prevented. That is, joining a group including a terminal located a short distance from a terminal corresponding to a group creator, but not located in the same space, i.e., the fourth terminal 400 being located in Room B, may be prevented. The first communication scheme and the second communication scheme may be discriminated from each other according to whether transmission is through the wall forming the predetermined space.

In step S340, the first terminal 100 receives responses from the terminals (the second terminal 200 and the third terminal 300 in FIG. 3) that have received the information about the first terminal 100 through the second communication scheme. In this case, the second terminal 200 and the third terminal 300 receive the information about the first terminal 100, and therefore, may transmit a response signal by using the first communication scheme or the second communication scheme. That is, the second terminal 200 and the third terminal 300 may transmit a response signal in a wireless communication scheme using an electromagnetic wave through the first communication scheme or in a sound or visible light communication scheme through the second communication scheme.

In step S350, the first terminal 100 generates the list of terminals, based on the responses from the terminals 200 and 300.

In step S360, the first terminal 100 selects at least one terminal to be connected to the first terminal 100 from the generated list. For example, the first terminal 100 may transmit a group invitation message to the terminals included in the list, based on an input of the user or automatically after the list is generated.

As illustrated in FIG. 3, a group of terminals may be limited to users in a predetermined space without user involvement, and thus, time taken to generate the group may be reduced, and user errors and mistakes may be prevented.

Conventionally, when the user of the first terminal 100, i.e., a group creator, directly establishes a group and invites members, there is inconvenience according to identifying members in the predetermined space and inviting the identified members to the group. In particular, when a number of members exist, a long time is taken, and there is a possibility that some members are not invited.

Figure 4:
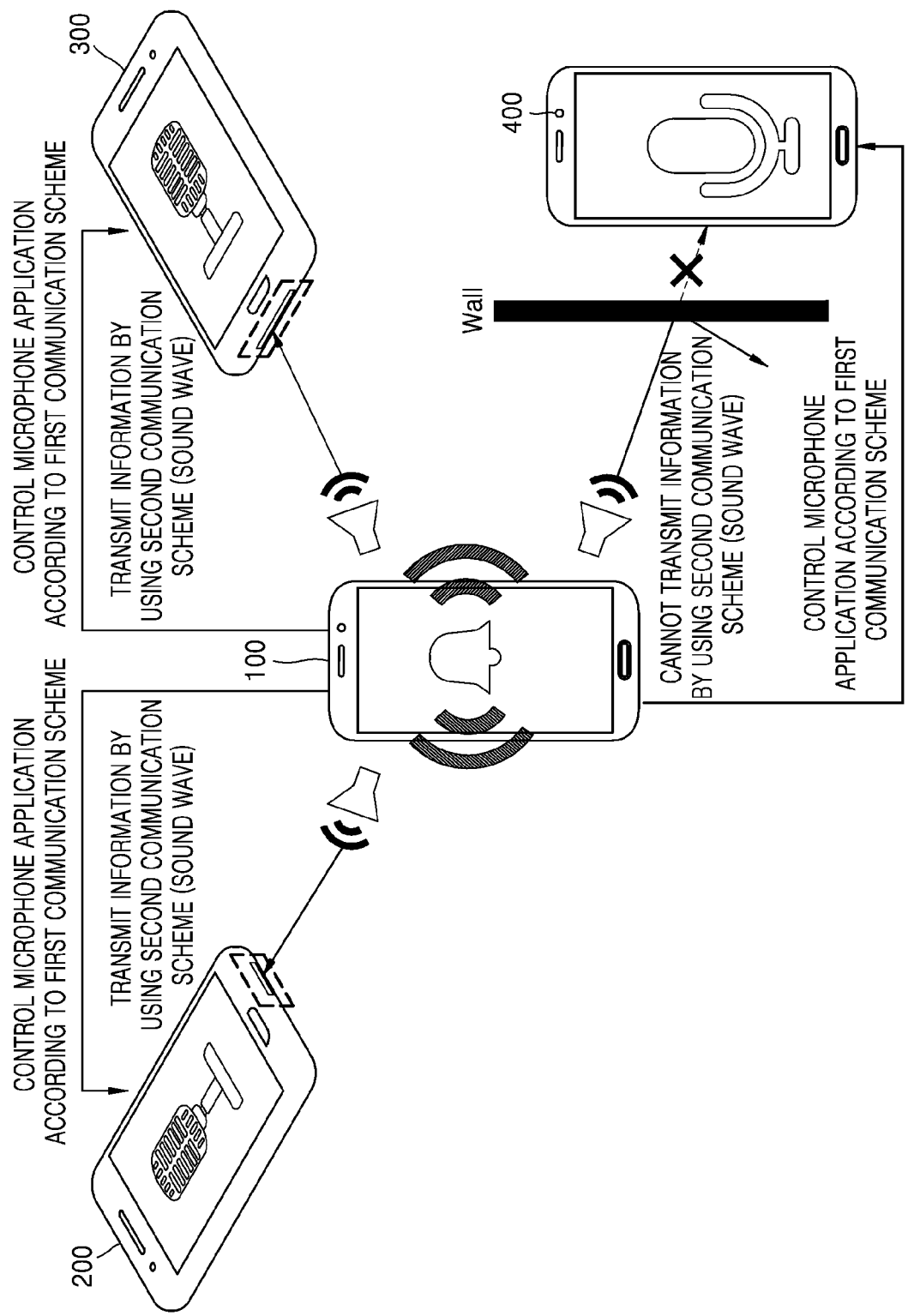
FIG. 4 illustrates a process of connecting terminals in a predetermined space by using wireless communication and sound communication, according to an embodiment of the present disclosure.

FIG. 4 illustrates a process of connecting terminals in a predetermined space by using wireless communication and sound communication, according to an embodiment of the present disclosure.

Referring to FIG. 4, the first communication scheme and the second communication scheme differ from each other with respect to a type and a function. As described above, the first communication scheme may be a wireless communication scheme using electromagnetic waves and the second communication scheme may be a sound communication scheme using sound waves.

Referring to FIG. 4, the first terminal 100 may control an input application of the second, third, and fourth terminals 200, 300, and 400 in the coverage area using the first communication scheme. Because the second communication scheme is a sound communication scheme using sound waves, the input application may be a microphone application capable of detecting sound waves. The first terminal 100 may activate the microphone application of the second, third, and fourth terminals 200, 300, and 400 in the coverage area through the first communication scheme.

As described above, to prevent excess power consumption of the second, third, and fourth terminals 200, 300, and 400, the first terminal 100 may request activation of the microphone application for a predetermined time.

Because the first communication scheme is a wireless communication scheme using electromagnetic waves, which may permeate the wall, the first terminal 100 may control the microphone application of each of the second terminal 200 and the third terminal 300 in Room A, and also the microphone application of the fourth terminal 400 in Room B.

After controlling using, the first communication scheme, the microphone applications of the second, third, and fourth terminals 200, 300, and 400 to run, the first terminal 100 broadcasts information about the first terminal 100 through the second communication scheme. Because the second communication scheme is a sound communication scheme using sound waves, the information about the first terminal 100 may be carried on sound waves, and the fourth terminal 400, which is located in a different room than the first terminal 100, the second terminal 200, and the third terminal 300, cannot receive the sound waves broadcasted by the first terminal 100. That is, because the sound waves broadcasted by the first terminal 100 cannot pass through the wall, the sound waves broadcasted by the first terminal 100 cannot be delivered to the fourth terminal 400.

Therefore, although the first terminal 100 controls, by using the first communication scheme, the microphone application of the fourth terminal 400 to run, because the fourth terminal 400 cannot receive the sound wave transmitted by the first terminal 100 using the second communication scheme, the fourth terminal 400 does not transmit a response signal. As a result, the first terminal 100 only receives responses from the second terminal 200 and the third terminal 300, and generates a list of terminals in a predetermined space, i.e., Room A, based on the received responses from the second terminal 200 and the third terminal 300.

Figure 5:
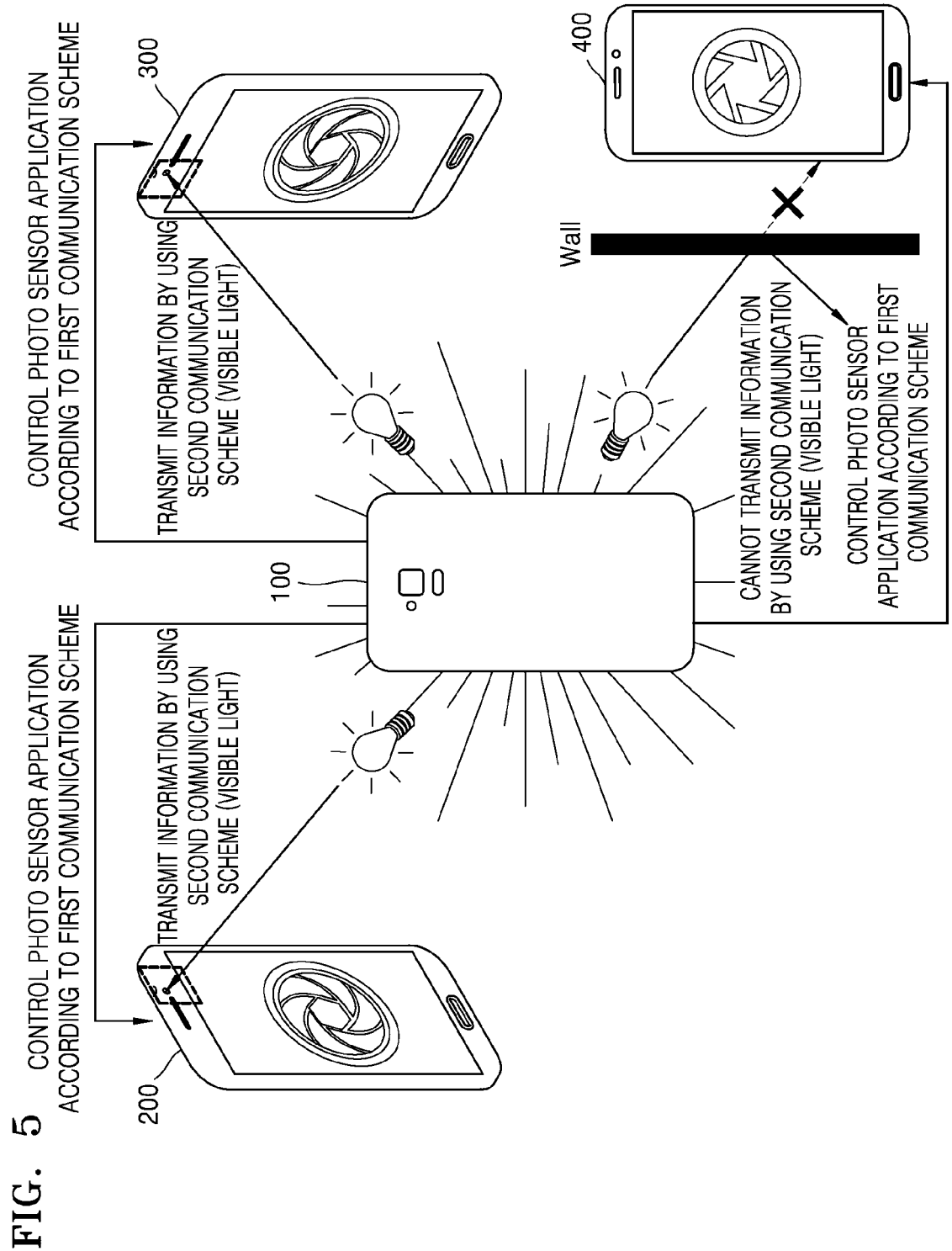
FIG. 5 illustrates a process of connecting terminals in a predetermined space by using wireless communication and visible light communication, according to an embodiment of the present disclosure.

FIG. 5 illustrates a process of connecting terminals in a predetermined space by using wireless communication and visible light communication, according to an embodiment of the present disclosure.

Referring to FIG. 5, the first communication scheme is a wireless communication scheme using an electromagnetic wave and the second communication scheme is a visible light communication scheme using visible light.

Visible light communication may transmit information using visible rays of 400 to 700 nm, e.g., by blinking, at a speed non-identifiable by the eyes, visible rays of an LED. For example, when a turn-on of the LED indicates "1" and a turn-off of the LED indicates "0", information may be transmitted to a light-reception side according to the blinking of the LED. However, because a human being cannot recognize blinking of more than 200 times per second, a user may perceive that the LED is continuously turned on.

The first terminal 100 may control an input application of the second, third, and fourth terminals 200, 300, and 400 in the coverage area of the first communication scheme. Because the second communication scheme is a visible light communication scheme using visible light, the input application may be a photo sensor application capable of detecting visible light. The first terminal 100 may activate the photo sensor applications of the second, third, and fourth terminals 200, 300, and 400 using the first communication scheme.

As described above, in order to prevent excessive power consumption of the second, third, and fourth terminals 200, 300, and 400, the first terminal 100 may request activation of the photo sensor applications only for a predetermined time. The photo sensor 164 may be included as a separate component, or an image sensor of a camera module may be used to detect visible light.

After controlling, by using the first communication scheme, the photo sensor applications of the second, third, and fourth terminals 200, 300, and 400 to run, the first terminal 100 may broadcast information about the first terminal 100 using the second communication scheme. Similar to FIG. 4, because the second communication scheme is a visible light communication scheme using visible light, which cannot be transmitted through a wall, the fourth terminal 400, which is located in Room B (a space that is different from the first terminal 100), the visible light broadcasted by the first terminal 100 cannot be delivered to the fourth terminal 400.

The second terminal 200 and the third terminal 300, however, receive the information about the first terminal 100 from the first terminal 100 and may transmit a response signal to the first terminal 100 to indicate that the second terminal 200 and the third terminal 300 received the visible light transmitted by the first terminal 100 and are located in the same area as the first terminal 100. As a result, the first terminal 100 receives responses from only the second terminal 200 and the third terminal 300 and generates a list of terminals, based on the received responses.

Figure 6:
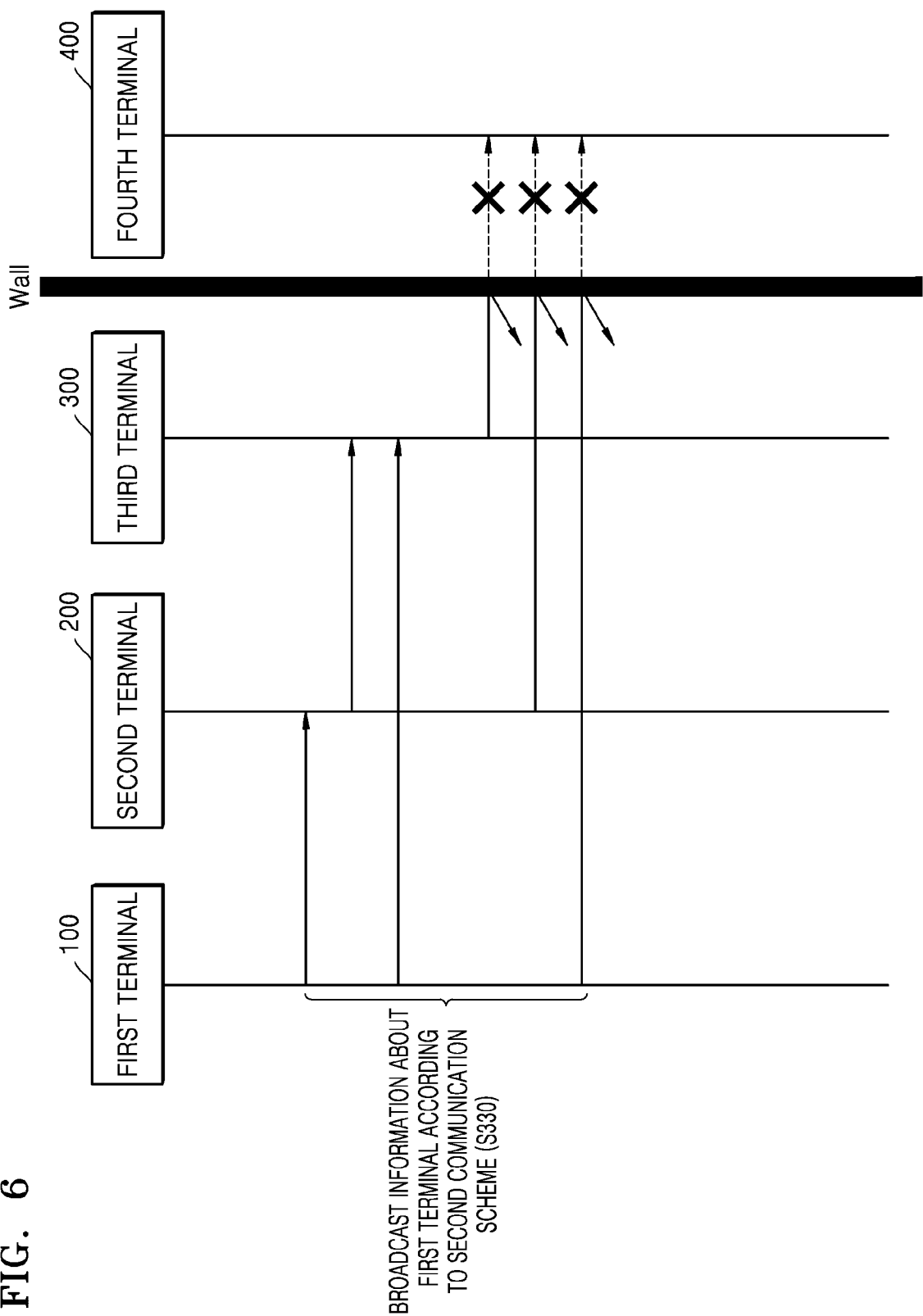
FIG. 6 illustrates a process of retransmitting, by an arbitrary terminal, information transmitted by a first terminal when connecting terminals in a predetermined space, according to an embodiment of the present disclosure.

FIG. 6 illustrates a process of retransmitting, by an arbitrary terminal, information transmitted by a first terminal when connecting terminals in a predetermined space, according to an embodiment of the present disclosure.

As illustrated in FIG. 3, the first terminal 100 may broadcast the information about the first terminal 100 using the second communication scheme, e.g., in step S330. In this case, because the information about the first terminal 100 is propagated in the space in the form of sound waves or visible light, according to the characteristic of the sound wave or visible light, a strength of a signal may decrease according to a transmission distance. Therefore, to transmit the information about the first terminal 100 to all terminals in the predetermined space, an arbitrary terminal in the predetermined space, which has received the information about the first terminal 100, may retransmit the information about the first terminal 100.

Referring to FIG. 6, the second terminal 200 and the third terminal 300, which have already received the information about the first terminal 100 through the second communication scheme, retransmit the information about the first terminal 100. Specifically, the second terminal 200 broadcasts, through the second communication scheme, the information about the first terminal 100 to the third terminal 300 and the fourth terminal 400, and the third terminal 300 broadcasts, through the second communication scheme, the information about the first terminal 100 to the fourth terminal 400. However, the fourth terminal 400 cannot receive the information about the first terminal 100 broadcasted by each of the first terminal 100, the second terminal 200, and the third terminal 300, through the second communication scheme, due to the wall forming the predetermined space.

The second terminal 200 and the third terminal 300, which have received the information about the first terminal 100 through the second communication scheme, may transmit a response signal by using the first communication scheme or the second communication scheme.

Figure 7A:
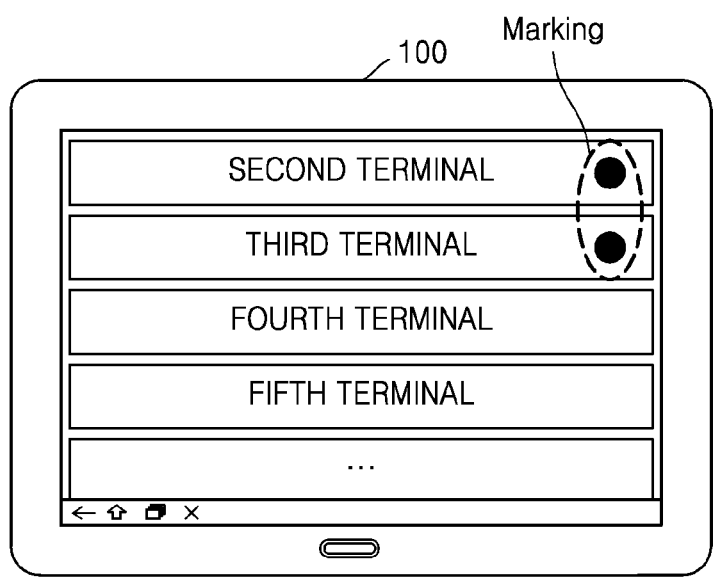
FIGS. 7A and 7B illustrate a user interface for displaying a list of terminals when connecting terminals in a predetermined space, according to an embodiment of the present disclosure.
Figure 7B:
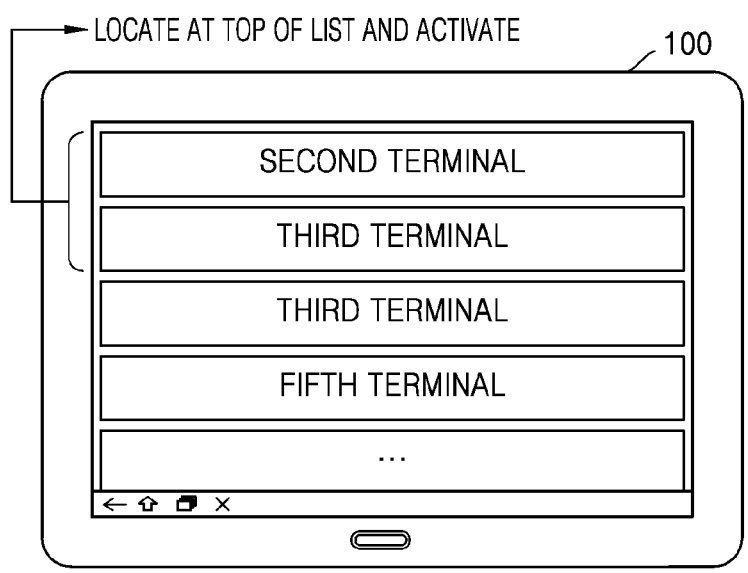

FIGS. 7A and 7B illustrate a user interface for displaying a list of terminals when connecting terminals in a predetermined space, according to an embodiment of the present disclosure.

As illustrated in FIG. 3, in step S350, the first terminal 100 may generate the list of terminals in the predetermined area in which the information about the first terminal 100 is delivered, based on responses from terminals in the predetermined area. In addition, in step S360, the first terminal 100 may select at least one terminal to be connected to the first terminal 100 from the generated list.

The first terminal 100 may display the generated list on the user interface 140 of the first terminal 100 such that the user of the first terminal 100 checks the generated list, or the first terminal 100 may allow the user to select at least one terminal to be connected to the first terminal 100 from the generated list through the user interface 140.

Referring to FIG. 7A, the user interface 140, which is displayed on a screen, includes at least one terminal which has communicated with the first terminal 100 or has been connected to the first terminal 100 and separately marks terminals that have received the information about the first terminal 100 and transmitted a response to the reception to the first terminal 100 at present.

Referring to FIG. 7B, the user interface 140 includes at least one terminal that has communicated with the first terminal 100 or has been connected to the first terminal 100 and arranges, at the top of the list, and activates terminals which have received the information about the first terminal 100 and transmitted a response to the reception to the first terminal 100.

The user may select at least one terminal desired to be connected to the first terminal 100 from the list displayed on the user interface 140.

Figure 8:
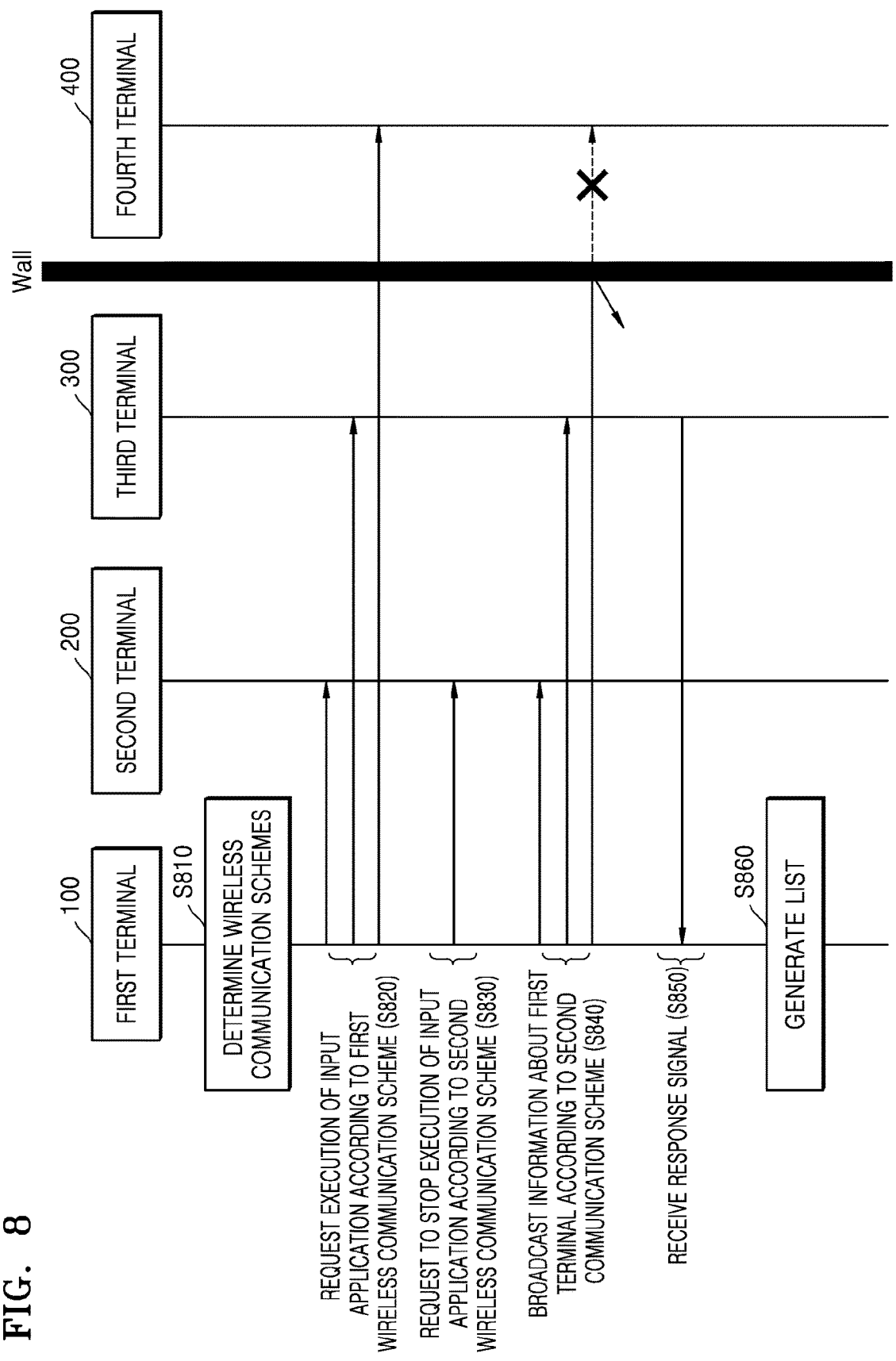
FIG. 8 illustrates a process of connecting terminals in a predetermined space, according to an embodiment of the present disclosure.

FIG. 8 illustrates a process of connecting terminals in a predetermined space, according to an embodiment of the present disclosure. Specifically, FIG. 8 illustrates a process in which the first terminal 100 connects terminals in the predetermined area, i.e., Room A, by communicating with the second, third, and fourth terminals 200, 300, and 400. Unlike FIG. 3, FIG. 8 relates to connecting to only some of the terminals located in the predetermined space. For example, if it is desired to exclude terminals located within a certain distance within the predetermined space, terminals may be connected in the method described below.

Referring to FIG. 8, in step S810, the first terminal 100 determines at least two wireless communication schemes, based on a coverage area, according to each of a plurality of wireless communication schemes included in the first communication scheme. Because a range of a coverage area also varies according to each wireless communication scheme, the first terminal 100 may determine a first wireless communication scheme and a second wireless communication scheme by taking into account the coverage area of each wireless communication scheme. For example, when the user of the first terminal 100 requests a list of terminals obtained by excluding the terminals located within the certain distance from the terminals in the predetermined space, the wireless communication schemes may be determined such that a wireless communication scheme having a communicable range corresponding to the certain distance is included.

Figure 9:
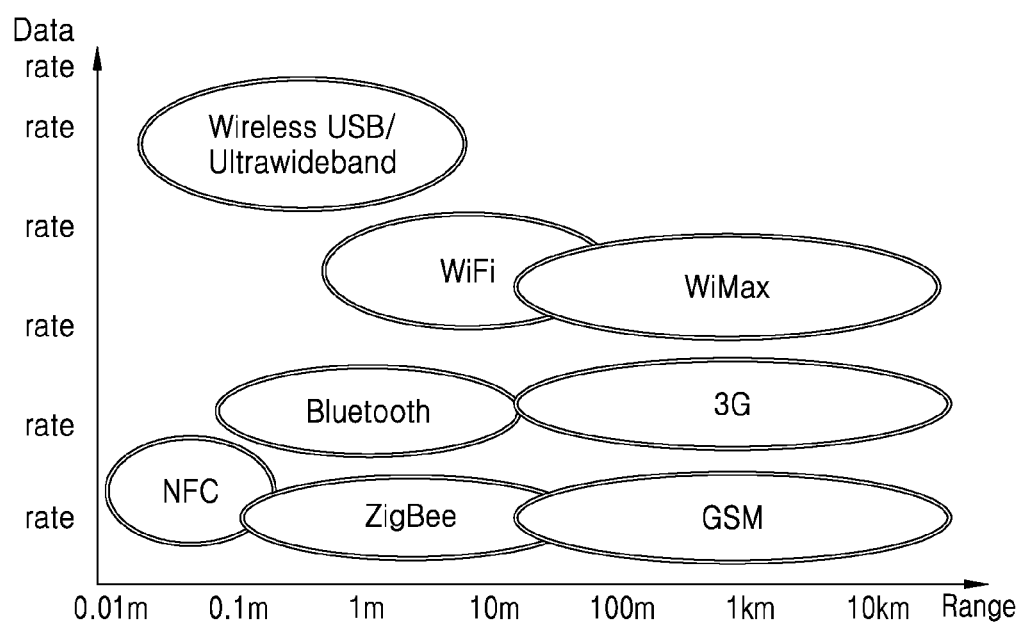
FIG. 9 is a graph illustrating communicable ranges and data rates of wireless communication schemes, according to an embodiment of the present disclosure.

FIG. 9 is a graph illustrating communicable ranges and data rates of wireless communication schemes according to an embodiment of the present disclosure.

Referring to FIG. 9, ZigBee, Bluetooth, Wi-Fi, etc., are for communication within several meters to tens meters. NFC is for communication only within an extremely short distance (about 10 cm), and when compared with other communication schemes, such as Bluetooth and Wi-Fi, NFC has a lower data rate. To establish effective connection between the first to fourth terminals 100, 200, 300, and 400, wireless communication schemes to be used as the first wireless communication scheme and the second wireless communication scheme may be determined based on a communicable zone, i.e., a coverage area, according to a communicable range.

Referring again to FIG. 8, in step S820, the first terminal 100 controls input applications of a plurality of terminals in a coverage area of the first wireless communication scheme, e.g., by transmitting a signal for controlling the input applications of the plurality of terminals through the first communication interface 110. As illustrated in FIG. 8, the first terminal 100 may request the second, third, and fourth terminals 200, 300, and 400 to execute the input application thereof by using the first wireless communication scheme.

The first terminal 100 may request the terminals in the coverage area of the first wireless communication scheme to execute the input applications for a predetermined time, and after the predetermined time elapses, the terminals in the coverage area of the first wireless communication scheme may automatically end the execution of the input applications to prevent excess power consumption.

In step S830, the first terminal 100 controls an input application of a plurality of terminals in a coverage area of the second wireless communication scheme by transmitting a signal for controlling the input applications of the plurality of terminals through the first communication interface 110. As illustrated in FIG. 8, the first terminal 100 may request the second terminal 200 to stop the execution of the input application of the second terminal 200 by using the second wireless communication scheme.

In step S840, the first terminal 100 may broadcast the information about the first terminal 100 according to a second communication scheme. For example, the information about the first terminal 100 may be identification information of the first terminal 100, identification information of a group which the first terminal 100 desires to create, or security information to be used to connect the terminals in the predetermined space.

Referring to FIG. 8, the signal for controlling the input application, which was transmitted according to the first wireless communication scheme, is delivered to the second, third, and fourth terminals 200, 300, and 400. However, a signal for controlling the input application, which was broadcasted according to the second wireless communication scheme, is delivered only to the second terminal 200 because only a location of the second terminal 200 is included in the coverage area of the second wireless communication scheme.

Further, the information about the first terminal 100, which is broadcasted using the second communication scheme, is received only by the third terminal 300. Specifically, the information about the first terminal 100 is not delivered to the fourth terminal 400 because the information about the first terminal 100 cannot pass through the wall forming the predetermined space, and the second terminal 200 cannot receive the information about the first terminal 100 because the input application was stopped in step S830.

Figure 10:
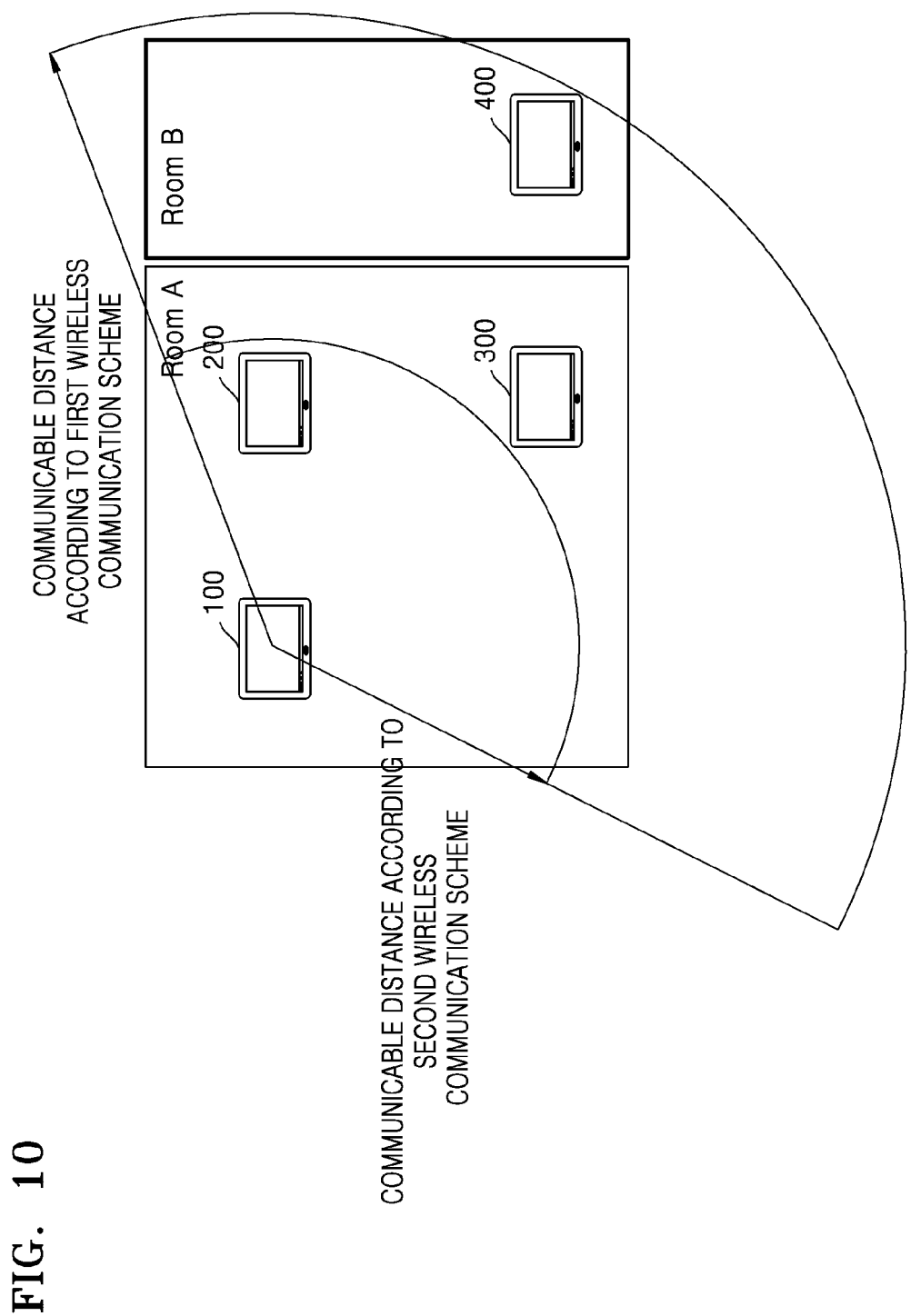
FIG. 10 illustrates locations and states of terminals in coverage areas according to respective wireless communication schemes when connecting terminals in a predetermined space, according to an embodiment of the present disclosure.

FIG. 10 illustrates locations and states of terminals in coverage areas according to respective wireless communication schemes when connecting terminals in a predetermined space, according to an embodiment of the present disclosure.

Referring to FIG. 10, the first terminal 100, the second terminal 200, and the third terminal 300 are located in Room A, and the fourth terminal 400 is located in Room B. As illustrated in FIG. 8, in step S810, the first wireless communication scheme and the second wireless communication scheme are determined in consideration of the coverage area of the first wireless communication scheme being greater than the coverage area of the second wireless communication scheme.

Accordingly, each of the second terminal 200, the third terminal 300, and the fourth terminal 400 are included in the coverage area of the first wireless communication scheme from the first terminal 100. Therefore, in step S820, the input applications of the second terminal 200, the third terminal 300, and the fourth terminal 400 are executed.

Only the second terminal 200 is included in the coverage area of the second wireless communication scheme from the first terminal 100. Therefore, in step S830, the input application of the second terminal 200 is stopped.

Thereafter, when the information about the first terminal 100 is broadcast using the second communication scheme, the information about the first terminal 100 is only received by the third terminal 300. As described above, the information about the first terminal 100 cannot be delivered to the fourth terminal 400 because of the wall, and is not received by the second terminal 200 because it has stopped the execution of the input application in step S830. Accordingly, only the third terminal 300 located in a partial region of the predetermined space is connected to the first terminal 100.

Referring again to FIG. 8, in step S850, the first terminal 100 receives a response from the third terminal 300. For example, the third terminal 300 may transmit a response signal according to the first communication scheme or the second communication scheme. That is, the third terminal 300 may transmit the response signal by using a wireless communication scheme using an electromagnetic wave according to the first wireless communication scheme or by using a sound or visible light communication scheme according to the second communication scheme.

In step S860, the first terminal 100 generates a list of terminals, based on the response of the third terminal 300 which has received the information about the first terminal 100 through the second communication scheme. The first terminal 100 may then transmit a group invitation message to the terminals included in the generated list, based on an input of the user or automatically after the list is generated.

Figure 11:
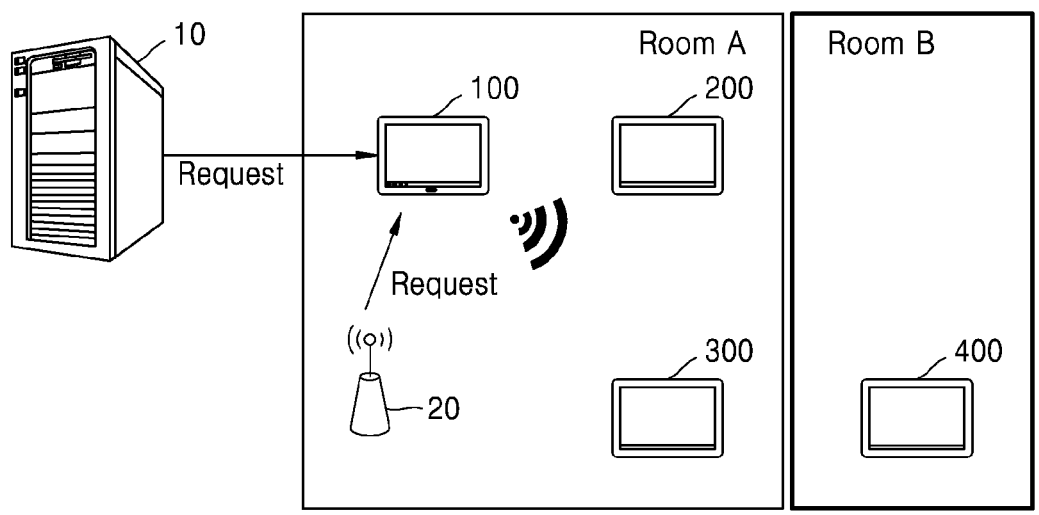
FIG. 11 illustrates an environment in which terminals communicating with a server or an access point (AP) are located, according to an embodiment of the present disclosure.

FIG. 11 illustrates an environment in which terminals communicating with a server or an AP are located, according to an embodiment of the present disclosure.

Referring to FIG. 11, the first terminal 100, the second terminal 200, and the third terminal 300 are located in Room A, and the fourth terminal 400 is located in Room B. The first terminal 100 is connected to a server 10 and/or a nearby AP 20 for providing an arbitrary service.

In FIG. 11, the server 10 or the AP 20 may request a list of the first terminal 100, the second terminal 200, and the third terminal 300 located in Room A.

Figure 12:
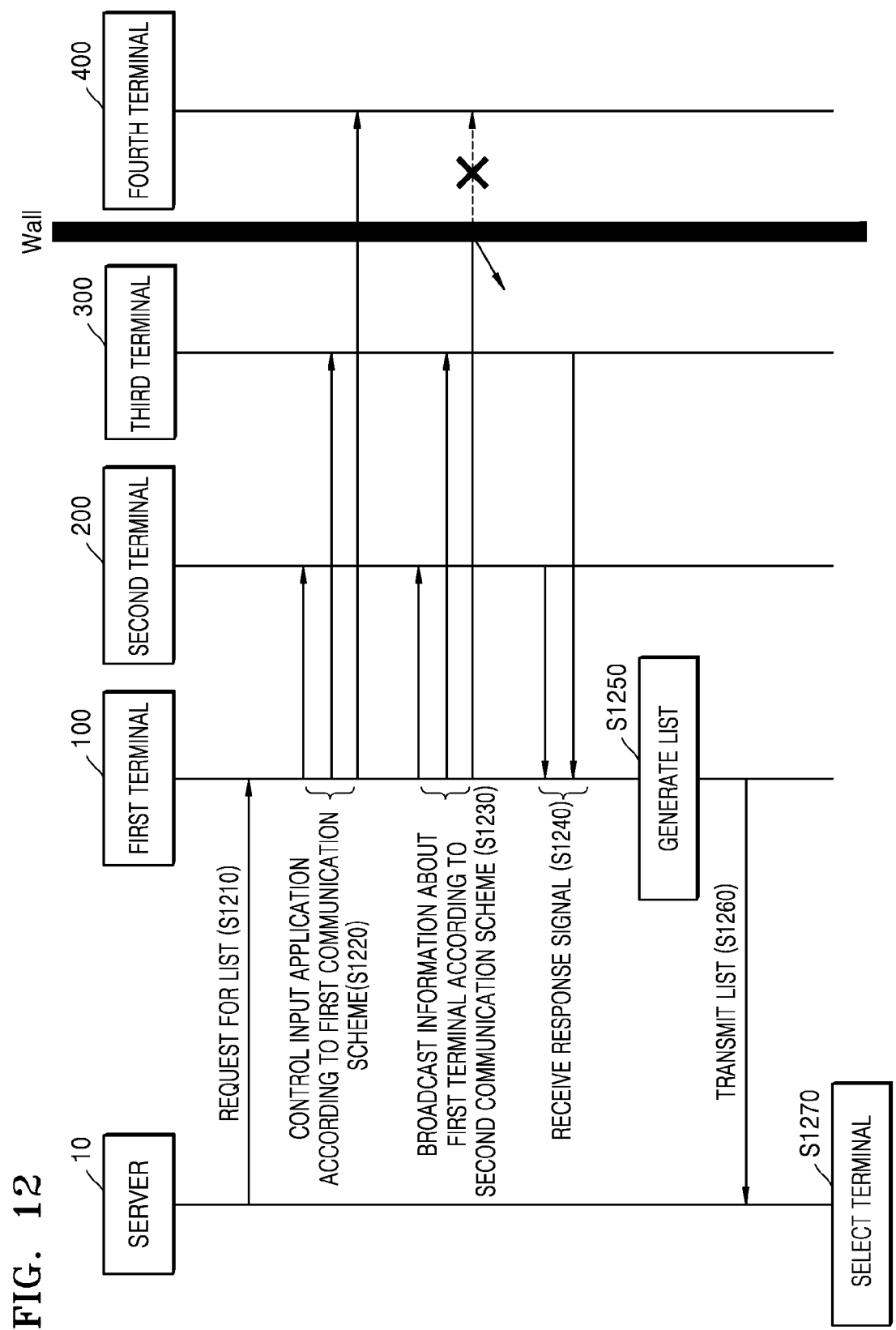
FIG. 12 illustrates a process of connecting terminals in a predetermined space, according to an embodiment of the present disclosure.

FIG. 12 illustrates a process of connecting terminals in a predetermined space, according to an embodiment of the present disclosure. For example, the process illustrated in FIG. 12 will be described with reference to the environment illustrated in FIG. 11.

Specifically, FIG. 12 illustrates a process in which the first terminal 100 receives a request for a list of terminals in the predetermined space from the server 10 (although the request could also be received from the AP 20) and connects the terminals in the predetermined space (the second terminal 200, the third terminal 300, and the fourth terminal 400). The first terminal 100 may transmit, to the server 10 or the AP 20, a list generated in response to the list request of the server 10 or the AP 20.

Referring to FIG. 12, in step S1210, the first terminal 100 receives, from the server 10, a request for a list of terminals in the predetermined space.

Steps S1220 to S1250 of FIG. 12 are the same as steps S320 to S350 of FIG. 3. Accordingly, a repetitive description of steps S1220 to S1250 is omitted.

In step S1260, the first terminal 100 transmits the generated list to the server 10.

In step S1270, the server 10 select at least one terminal to be connected to the first terminal 100 from the generated list.

Figure 13:
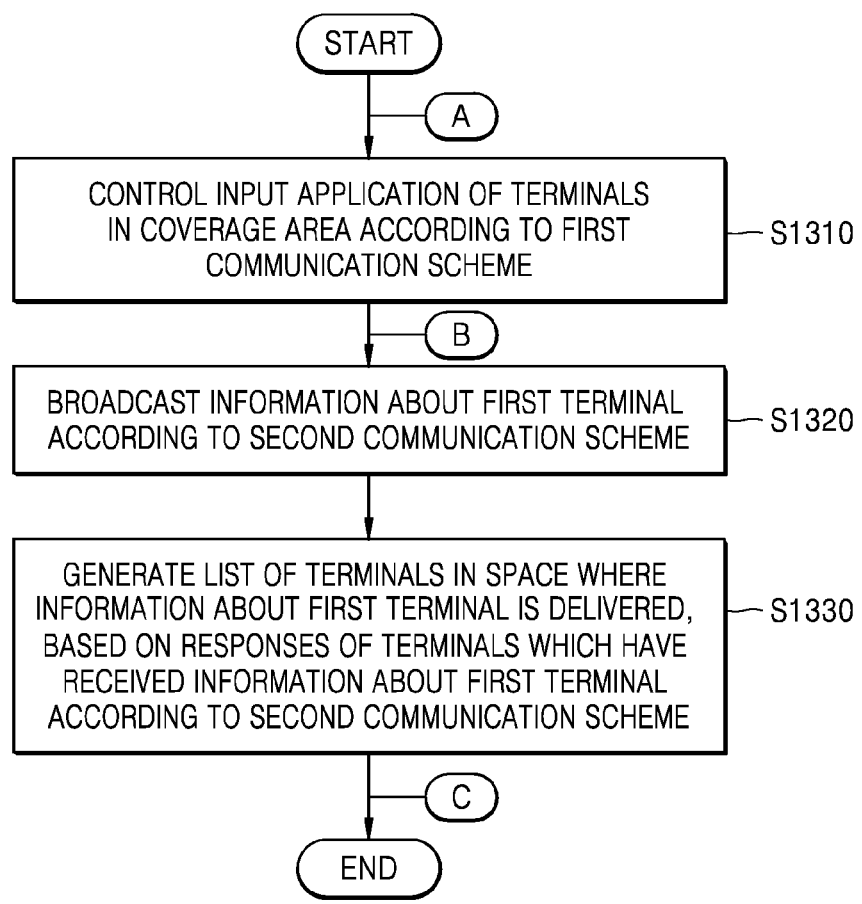
FIG. 13 is a flowchart illustrating a method of connecting terminals in a predetermined space, according to an embodiment of the present disclosure.

FIG. 13 is a flowchart illustrating a method of connecting terminals in a predetermined space, according to an embodiment of the present disclosure.

Referring to FIG. 13, in step S1310, the first terminal 100 controls input applications of terminals in a coverage area of the first communication scheme. A type of the input application may be determined according to a type of the second communication scheme. For example, when the second communication scheme is a sound communication scheme using sound waves, the input application may be a microphone application for receiving sound waves, or when the second communication scheme is a visible light communication scheme using visible light, the input application may be a photo sensor application for receiving visible light.

In step S1310, the first terminal 100 request terminals in the coverage area of the first communication scheme to execute the input applications for a predetermined time, and after the predetermined time elapses, the terminals may automatically end the execution of the input applications to prevent excess power consumption.

Although not illustrated in FIG. 13, step S1310 may be performed when the first terminal 100 receives a request for connecting the terminals in the predetermined space from the user or when a certain condition or situation occurs. Alternatively, the first terminal 100 may receive a request for a list of the terminals in the predetermined space from the server 10 or the AP 20, as illustrated in FIG. 12.

In step S1320, the first terminal 100 broadcasts information about the first terminal 100 using a second communication scheme. The first communication scheme and the second communication scheme may be differentiated from each other according to whether transmission may be performed through a wall forming the predetermined space. When a characteristic of sound waves or visible light having low permeability is used for the second communication scheme, connection of a close terminal located outside the wall forming the predetermined space may be prevented.

In step S1330, the first terminal 100 generates a list of terminals in a space where the information about the first terminal 100 is delivered, based on responses from terminals that received the information about the first terminal 100 through the second communication scheme.

Figure 14:
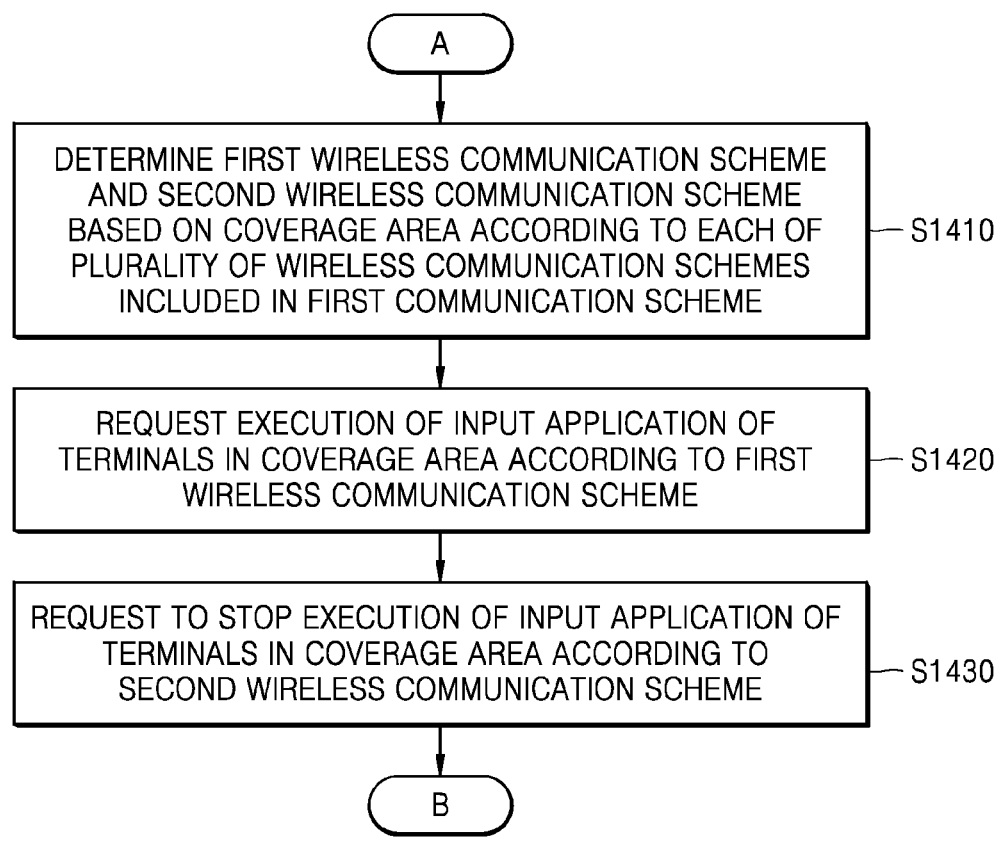
FIG. 14 is a flowchart illustrating a method of controlling an input application of terminals, when connecting terminals in a predetermined space, according to an embodiment of the present disclosure.

FIG. 14 is a flowchart illustrating a method of controlling an input application of terminals when connecting terminals in a predetermined space, according to an embodiment of the present disclosure. Similar to FIG. 8, this method may be applied in step S1310 of FIG. 13, when desiring to connect at least one terminal located in a partial region among the terminals in the predetermined space by controlling execution or stop of the input application of the terminals. That is, this method may be performed to exclude at least one terminal located in a predetermined region among the terminals in the predetermined space.

Referring to FIG. 14, in step S1410, the first terminal 100 determines the first wireless communication scheme and the second wireless communication scheme based on a coverage area according to each of a plurality of wireless communication schemes. A partial region in the predetermined space may be specified again by taking into account overlapping a coverage area according to the first wireless communication scheme with a coverage area according to the second wireless communication scheme.

In step S1420, the first terminal 100 requests terminals in the coverage area according to the first wireless communication scheme to execute the input application.

In step S1430, the first terminal 100 requests terminals in the coverage area of the second wireless communication scheme to stop the execution of the input application.

When the coverage area according to the first wireless communication scheme is greater than the coverage area according to the second wireless communication scheme, only terminals outside of the coverage area of the second wireless communication scheme, but still located within the coverage area of the first wireless communication scheme, execute the input application because the terminals in the coverage area of the second wireless communication scheme receive a request to stop execution of the input application, before the first terminal 100 broadcasts information about the first terminal 100 using the second communication scheme. Accordingly, at least one terminal located in a partial region among the terminals in the predetermined space may be connected.

Figure 15:
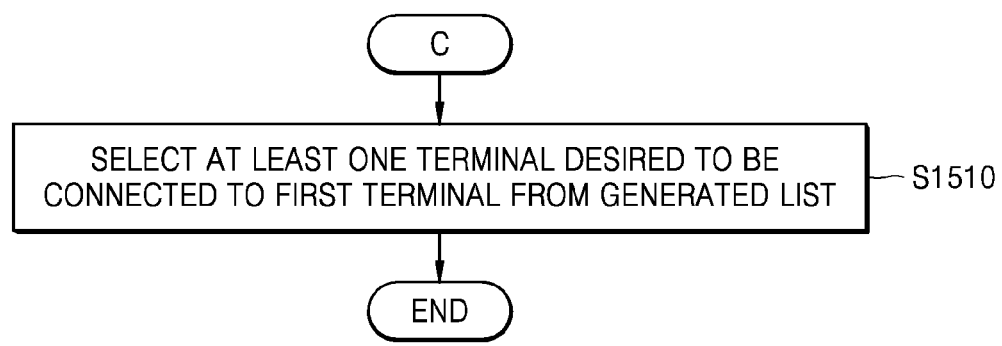
FIG. 15 is a flowchart illustrating a method of selecting a terminal from a list of terminals, when connecting terminals in a predetermined space, according to an embodiment of the present disclosure.

FIG. 15 is a flowchart illustrating a method of selecting a terminal from a list of terminals when connecting terminals in a predetermined space, according to an embodiment of the present disclosure.

Referring to FIG. 15, in step S1510, which may occur after step S1330 of FIG. 13, the first terminal 100 selects at least one terminal to be connected to the first terminal 100 from the generated list. For example, the first terminal 100 may automatically group the terminals included in the list after generating the list or allow the user to select a portion of the terminals included in the list. Alternatively, after automatically connecting the terminals included in the generated list to the first terminal 100, the terminals to be disconnected from the first terminal 100 may be selected.

The above described methods of connecting terminals in a predetermined space, according to one or more embodiments of the present disclosure can be written as computerexecutable programs and can be implemented in general-use digital computers that execute the programs using a non-transitory computer-readable recording medium. Examples of the non-transitory computer-readable recording medium include storage media such as magnetic storage media (e.g., ROM, floppy disks, hard disks, etc.) and optical recording media (e.g., CD-ROMs, or DVDs).

While the present disclosure has been particularly shown and described with reference to certain embodiments thereof, it will be understood by those of ordinary skill in the art that various changes in form and details may be made therein without departing from the spirit and scope of the present disclosure as defined by the following claims and their equivalents.

What is claimed is:

1. A first terminal for connecting terminals located in a predetermined space, the first terminal comprising:
    a first communication interface configured to transmit a signal, for executing an input application which enables a plurality of terminals to receive information through a first communication scheme, to the plurality of terminals through a second communication scheme;
    a second communication interface configured to broadcast information about the first terminal through the first communication scheme;
    a processor configured to receive at least one response, from at least one terminal from among the plurality of terminals, in response to the broadcasted information and generate a list of terminals located in the predetermined space, based on the at least one response from the at least one terminal; and
    a display configured to display the generated list to a user and receive an operation from the user to select at least one terminal from the generated list to be connected to the first terminal,
    wherein the operation received from the user allows the at least one terminal selected by the user to be connected to the first terminal, and
    wherein a coverage area of the second communication scheme is greater than a coverage area of the first communication scheme.

2. The first terminal of claim 1, wherein the second communication scheme comprises a wireless communication scheme using electromagnetic waves,
    wherein the input application comprises a microphone application, and
    wherein the first communication scheme comprises a sound communication scheme using sound waves.

3. The first terminal of claim 1, wherein the second communication scheme comprises a wireless communication scheme using electromagnetic waves,
    wherein the input application comprises a photo sensor application, and
    wherein the first communication scheme comprises a visible light communication scheme.

4. The first terminal of claim 1, wherein the information about the first terminal is retransmitted by a terminal that has received the information about the first terminal from the first terminal.

5. The first terminal of claim 1, wherein the second communication scheme is transmittable through a wall forming the predetermined space, and
    wherein the first communication scheme is not transmittable through the wall forming the predetermined space.

6. The first terminal of claim 1, wherein the processor is further configured to determine a first wireless communication scheme and a second wireless communication scheme based on respective coverage areas of the first wireless communication scheme and the second wireless communication scheme,
    wherein the first communication interface is further configured to transmit, through the second wireless communication scheme, a request signal for stopping execution of the input application of terminals located in the coverage area of the second wireless communication scheme, after transmitting the signal for executing the input application through the first wireless communication scheme, and
    wherein the coverage area of the first wireless communication scheme is greater than the coverage area of the second wireless communication scheme.

7. The first terminal of claim 1, wherein the first communication interface is further configured to request the plurality of terminals in the coverage of the second communication scheme to execute the input application for a predetermined time.

8. The first terminal of claim 1, wherein the first communication interface is further configured to receive a request for the list of the terminals in the predetermined space from a server, and to transmit the generated list to the server in response to the request.

9. The first terminal of claim 1, wherein the first communication interface is further configured to transmit a group invitation message to the terminals included in the generated list.

10. A method of connecting terminals located in a predetermined space, the method comprising:
    transmitting, by a first terminal, a signal, for executing an input application which enables a plurality of terminals to receive information through a first communication scheme, to the plurality of terminals through a second communication scheme;
    broadcasting, by the first terminal, information about the first terminal through the first communication scheme;
    receiving, at least one response, from at least one terminal from among the plurality of terminals, in response to the broadcasted information;
    generating a list of terminals located in the predetermined space, based on the at least one response from the last at least one terminal; and
    receiving an operation from a user to select at least one terminal from the generated list to be connected with the first terminal,
    wherein the operation received from the user allows the at least one terminal selected by the user to be connected to the first terminal, and
    wherein a coverage area of the second communication scheme is greater than a coverage area of the first communication scheme.

11. The method of claim 10, wherein the second communication scheme comprises a wireless communication scheme using electromagnetic waves,
    wherein the input application comprises a microphone application, and
    wherein the first communication scheme comprises a sound communication scheme using sound waves.

12. The method of claim 10, wherein the second communication scheme comprises a wireless communication scheme using electromagnetic waves,
    wherein the input application comprises a photo sensor application, and wherein the first communication scheme comprises a visible light communication scheme.

13. The method of claim 10, wherein the information about the first terminal is retransmitted by a terminal that has received the information about the first terminal from the first terminal.

14. The method of claim 10, wherein the second communication scheme is transmittable through a wall forming the predetermined space, and
wherein the first communication scheme is not transmittable through the wall forming the predetermined space.

15. The method of claim 10, further comprising:
determining a first wireless communication scheme and a second wireless communication scheme based on respective coverage areas of the first wireless communication scheme and the second wireless communication scheme; and
transmitting, through the second wireless communication scheme, a request signal for stopping execution of the input application of terminals located in the coverage area of the second wireless communication scheme, after transmitting the signal for executing the input application through the first wireless communication scheme,
wherein the coverage area of the first wireless communication scheme is greater than the coverage area of the second wireless communication scheme.

16. The method of claim 10, wherein the signal for executing input application requests the plurality of terminals to execute the input application for a predetermined time.

17. The method of claim 10, further comprising:
receiving, from a server, a request for the list of the terminals in the predetermined space; and
transmitting the generated list to the server in response to the request.

18. A non-transitory computer-readable recording medium having recorded thereon a computer-readable program, which when executed by a first terminal, performs a method comprising:
transmitting, by the first terminal, a signal, for executing an input application which enables a plurality of terminals to receive information through a first communication scheme, to the plurality of terminals through a second communication scheme;
broadcasting, by the first terminal, information about the first terminal through the first communication scheme;
receiving, at least one response, from at least one terminal from among the plurality of terminals, in response to the broadcasted information;
generating a list of terminals located in a predetermined space, based on the at least one response from the at least one terminal; and
receiving an operation from a user to select at least one terminal from the generated list to be connected with the first terminal,
wherein the operation received from the user allows the at least one terminal selected by the user to be connected to the first terminal, and
wherein a coverage area of the second communication scheme is greater than a coverage area of the first communication scheme.

* * * * *